US006765048B2

(12) United States Patent
Dohrer et al.

(10) Patent No.: US 6,765,048 B2
(45) Date of Patent: Jul. 20, 2004

(54) POLYETHYLENE COMPOSITIONS AND FILMS FORMED THEREFORM HAVING IMPROVED MOISTURE VAPOR TRANSMISSION RATES

(75) Inventors: Kathryn Kobes Dohrer, Longview, TX (US); Wesley Raymond Hale, Kingsport, TN (US); Irving Daniel Sand, Loveland, OH (US); Mark Alan Edmund, Longview, TX (US); Martin Ray Tant, Kingsport, TN (US); Emmett Dudley Crawford, Kingsport, TN (US); Edward Philip Savitski, Kingsport, TN (US); Dennis Brannon Barr, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/177,979

(22) Filed: Jun. 21, 2002

(65) Prior Publication Data

US 2002/0183433 A1 Dec. 5, 2002

Related U.S. Application Data

(63) Continuation of application No. 09/627,502, filed on Jul. 28, 2000, now abandoned.

(51) Int. Cl.[7] ............................ C08K 3/26; C08L 23/04
(52) U.S. Cl. ........................ 524/425; 524/515; 525/240
(58) Field of Search ................................ 524/425, 515; 525/240

(56) References Cited

U.S. PATENT DOCUMENTS

| | | | | |
|---|---|---|---|---|
| 4,116,892 | A | | 9/1978 | Schwarz |
| 4,427,614 | A | | 1/1984 | Barham et al. |
| 4,626,252 | A | | 12/1986 | Nishizawa et al. |
| 4,880,592 | A | | 11/1989 | Martini et al. |
| 5,073,316 | A | | 12/1991 | Bizen et al. |
| 5,972,444 | A | * | 10/1999 | Patel et al. |
| 5,998,505 | A | | 12/1999 | Brink |
| 6,359,050 | B1 | * | 3/2002 | Dohrer et al. |

FOREIGN PATENT DOCUMENTS

| | | | |
|---|---|---|---|
| EP | 0 283 200 | A | 9/1988 |
| EP | 0 380 353 | A2 | 8/1990 |
| JP | 56-62117 | A | 4/1984 |
| JP | 07 118431 | A | 5/1995 |
| WO | WO 98/05501 | A1 | 2/1998 |
| WO | WO 00/23255 | A1 | 4/2000 |

* cited by examiner

*Primary Examiner*—Tae H. Yoon
(74) *Attorney, Agent, or Firm*—Jonathan D. Wood; Bernard J. Graves, Jr.

(57) ABSTRACT

A novel composition is provided comprising a specified polyethylene component and a filler such that a film formed from the composition is characterized by having increased moisture vapor transmission rate. Also disclosed is a novel polyethylene composition useful in producing film.

14 Claims, No Drawings

POLYETHYLENE COMPOSITIONS AND FILMS FORMED THEREFORM HAVING IMPROVED MOISTURE VAPOR TRANSMISSION RATES

This application is a continuation of prior application Ser. No. 09/627,502, filed Jul. 28, 2000, now abandoned.

FIELD OF THE INVENTION

This invention relates to polyethylene compositions that are new and useful, and films produced therefrom that are characterized by preferably having increased moisture vapor transmission rates (MVTR).

BACKGROUND OF THE INVENTION

It is known that properly formulated films fabricated from polyethylene that have been filled with solid particles (e.g., a mineral such as calcium carbonate) can be stretched under appropriate conditions creating a porous structure that allows for the diffusion of water vapor while providing a liquid water barrier. This is a desirable property in markets such as hygienics, industrial and medical. Indeed, a major consideration in the comfort of a garment is its ability to maintain a balance between heat production and heat loss. The loss of heat through clothing may occur through direct dry heat loss or by moisture evaporation. In respect to the latter, the moisture vapor transmission rate of the material utilized in forming the garment is generally related to the breathability of the material. Breathability is the ability to diffuse moisture/water vapor through a film or garment. In addition to this property, there are many applications requiring that the material used in preparing the garment be impermeable to a liquid. Such applications include diaper back sheets, sanitary napkins, medical protective garments, surgical incise drapes, transdermal patches, wound care bandages and dressings, intravenous site dressings, ostomy site dressings, breathable housewrap, among others.

Films which are permeable to water vapor and are porous but yet are intended to be impermeable to a liquid are described in U.S. Pat. Nos. 4,626,252 and 5,073,316. As disclosed, a porous film is obtained by mixing a polyolefin resin, an inorganic filler and a plasticizer; forming a film from the mixture; and uniaxially or biaxially stretching the film. Films of this type are also disclosed in U.S. Pat. No. 5,998,505 and PCT International Application Publication No. WO 98/05501.

SUMMARY OF THE INVENTION

It is accordingly an object of the present invention to provide new and improved polyethylene compositions or blends.

It is a further object of this invention to provide novel polyethylene compositions or blends of specific polyethylenes and fillers.

It is a further object of this invention to provide novel films produced from the novel compositions, which films are characterized by having improved moisture vapor transmission rates (MVTR).

These and other objects and advantages of the present invention will be apparent to those skilled in the art from the following detailed description and claims.

In accordance with the present invention, it has been found that the above and still further objects are achieved by combining a first polyethylene component having specified characteristics and a second polyethylene component having specified characteristics to provide a novel resultant polyethylene composition. A filler is added to the novel polyethylene composition to provide novel polyethylene-filler compositions that are suitable to provide novel films that are characterized by having increased moisture vapor transmission rates (MVTR). The compositions and films are useful in many applications.

More particularly, in accordance with the present invention, a polyethylene composition is provided comprising (a) a first ethylene homopolymer or ethylene interpolymer having a density of from about 0.88 to about 0.93 g/cc (grams/cubic centimeter), a melt index of from about 1 to about 5 g/10 min (grams/10 minutes), a weight percent high temperature fraction (% HT) as determined by TREF of about 0 to about 50 weight %, and a number average molecular weight (Mn) of the HT fraction collected during the TREF procedure of about 15,000 to about 100,000 g/mol, present in an amount of from about 1 to about 99 weight percent (%) based on the total weight of the polyethylene composition; and (b) a second ethylene homopolymer or ethylene interpolymer having a density of from about 0.93 to about 0.97 g/cc, a melt index of from about 1 to about 50 g/10 min, a % HT fraction as determined by TREF of about 25 to about 100 weight %, and a Mn of the HT fraction collected during the TREF procedure of about 15,000 to about 100,000 g/mol, present in an amount of from about 1 to about 99 weight %, based on the total weight of the polyethylene composition.

The resultant polyethylene composition is characterized by having a density of from about 0.91 to about 0.93 g/cc, a melt index of from about 1 to about 5 g/10 min, a weight percent high temperature fraction (% HT) as determined by TREF of about 25 to about 50 weight %, and a number average molecular weight (Mn) of the HT fraction collected during the TREF procedure of from about 35,000 to about 52,000 g/mol. In a preferred embodiment, the % HT of the polyethylene composition ranges from about 30 to about 45 weight %.

Further, in accordance with the present invention, there is provided a novel polyethylene-filler composition comprising (i) a polyethylene composition, as hereinbefore defined, having a density of from about 0.91 to about 0.93 g/cc, a melt index of from about 1 to about 5 g/10 min, a weight percent high temperature fraction (% HT) as determined by TREF of about 25 to about 50 weight %, and a number average molecular weight (Mn) of the HT fraction collected during the TREF procedure of from about 35,000 to about 52,000 g/mol with the % HT of the polyethylene composition preferably ranging from about 30 to about 45 weight %; the polyethylene composition comprises (a) a first ethylene homopolymer or ethylene interpolymer having a density of from about 0.88 to about 0.93 g/cc (grams/cubic centimeter), and a melt index of from about 1 to about 5 g/10 min (grams/10 minutes), a % HT as determined by TREF of about 0 to about 50 weight %, and a Mn of the HT fraction collected during the TREF procedure of about 15,000 to about 100,000 g/mol, present in an amount of from about 1 to about 99 weight percent (%) based on the total polyethylene composition; and (b) a second ethylene homopolymer or ethylene interpolymer having a density of from about 0.93 to about 0.97 g/cc, a melt index of from about 1 to about 50 g/10 min, a % HT fraction as determined by TREF of about 25 to about 100 weight %, and a Mn of the HT fraction collected during the TREF procedure of about 15,000 to about 100,000 g/mol, present in an amount of from about 1 to about 99 weight %, based on the total weight of the polyethylene composition, the polyethylene composition preferably being present in the polyethylene-filler composition in an amount of from about 20 to about 80 weight percent (%) based on the total weight of the polyethylene-filler composition; and (ii) a filler present in an effective amount, such that a film formed from the novel polyethylene-filler composition has increased MVTR; preferably the filler is present in the polyethylene-filler composition in an amount of from about 20 to about 80 weight percent, based on the total weight of the polyethylene-filler composition.

In addition to the novel compositions, the present invention is also directed to films formed from the novel polyethylene-filler compositions that are characterized by having increased moisture vapor transmission rates.

Additionally, the present invention is directed to articles of manufacture incorporating the novel compositions and novel films of the present invention. Such articles include garments, diapers, sanitary napkins, medical protective garments, surgical incise drapes, transdermal patches, wound care bandages and dressings, intravenous site dressings, and ostomy site dressings, and others, incorporating the novel compositions and films of the present invention.

DETAILED DESCRIPTION OF THE INVENTION

The polyethylene compositions of the present invention comprise (a) a first ethylene homopolymer or ethylene interpolymer having a density of from about 0.88 to about 0.93 g/cc (grams/cubic centimeter), a melt index of from about 1 to about 5 g/10 min (grams/10 minutes), a % HT as determined by TREF of about 0 to about 50 weight %, and a Mn of the HT fraction collected during the TREF procedure of about 15,000 to about 100,000 g/mol, present in an amount of from about 1 to about 99 weight percent (%) based on the total weight of the polyethylene composition; and (b) a second ethylene homopolymer or ethylene interpolymer having a density of from about 0.93 to about 0.97 g/cc, a melt index of from about 1 to about 50 g/10 min, a % HT fraction as determined by TREF of about 25 to about 100 weight %, and a Mn of the HT fraction collected during the TREF procedure of about 15,000 to about 100,000 g/mol, present in an amount of from about 1 to about 99 weight %, based on the total weight of the polyethylene composition.

The resultant polyethylene composition is characterized by having a density of from about 0.91 to about 0.93 g/cc, a melt index of from about 1 to about 5 g/10 min, a weight percent high temperature fraction (% HT) as determined by TREF of about 25 to about 50 weight %, and a number average molecular weight (Mn) of the HT fraction collected during the TREF procedure of from about 35,000 to about 52,000 g/mol. In a preferred embodiment, the % HT of the polyethylene composition ranges from about 30 to about 45 weight %.

The first and second ethylene components of the polyethylene composition of the present invention are homopolymers of ethylene or interpolymers of ethylene and at least one or more other olefin(s). Preferably, the olefins are alpha-olefins. The olefins may contain from about 2 to about 16 carbon atoms. The interpolymers of ethylene and at least one other olefin comprise an ethylene content of at least about 50% by weight of the total monomers involved. Exemplary olefins that may be utilized herein are propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene.

The ethylene homopolymers or interpolymers of the polyethylene composition may be prepared by any manner known to those skilled in the art, such as by a gas phase fluidized bed process. As is well known in the industry, the gas phase fluidized bed process is a low pressure process wherein there are generally utilized as catalysts, transition metals in combination with metal halides or activated metal oxides. In more detail, the gas phase fluidized bed process that may be used for producing the polyethylenes utilized herein entails the polymerization process taking place in a fluid bed reactor operating at about 300 psi at temperatures below 100° C. The reactor residence time is about 4 hours. The bed is kept fluidized by circulating the feed gas with a compressor. Exchangers in this cycle gas loop remove the heat of reaction. The polymer granules are continuously removed from the fluid bed in small batches by a cyclic removal system. The residual monomers are degassed and the granules are treated to deactivate the catalyst. The polymer granules and various additives are fed to a twin screw compounding extruder. The extruder puts sufficient work into the solids to melt and mix the solids. The melt is forced through an underwater die-face cutter to form conventional pellets. The pellets are then dried and packaged.

As indicated above, the polyethylene components of the polyethylene composition may be prepared using any technique. Moreover, the first and second polyethylenes are commercially available.

Examples of the first polyethylene are Eastman Chemical Company polyethylenes including MXSTEN CM 27057-F, MXSTEN CM 27058-F, and MXSTEN CV 77501-X, and Dow Chemical Company polyethylenes including ATTANE 4201, ATTANE 4206, and DOWLEX 2247A. Examples of the second polyethylenes are Eastman Chemical Company TENITE H6005-A, Solvay Polymers, Inc., FORTIFLEX T50-2000, Dow Chemical Company HDPE 04452N, and HDPE 10462N.

For many purposes, it may be desirable to incorporate other conventional additives with the polyethylene compositions of the present invention. For example, there may be added antioxidants, heat and light stabilizers, dyes, antistatic agents, lubricants, preservatives, processing aids, slip agents, antiblocking agents, pigments, flame retardants, blowing agents, and the like. More than one additive may be used. The additive may be present in any desired amount. Accordingly, the amount of additive utilized will depend upon the particular polyethylenes used and the application or usage intended for the composition and film. Compositions containing such other additives are within the scope of this invention. It is within the skill of the ordinary artisan in possession of the present disclosure to select the appropriate additive(s) and amount thereof depending on the processing conditions and end use of the composition.

The novel polyethylene compositions comprising the specified polyethylene components can be readily prepared utilizing any conventional method, and novel films can be formed from the resultant polyethylene compositions utilizing any means known in the art. For example, polyethylene compositions can be prepared in an apparatus such as a torque rheometer, a single screw extruder or a twin screw extruder. Formation of films from the resulting compositions can be achieved by blown-film technique, cast-film technique, melt extrusion, as described, for example, in U.S. Pat. No. 4,880,592, or by compression molding as described, for example, in U.S. Pat. No. 4,427,614, or by any other suitable method.

In preparing the polyethylene compositions of the examples herein, the polyethylene components were melt blended in a Berstorff 40 mm twin screw co-rotating extruder at 180° C. The extruder is equipped with a gentle compounding screw consisting of forward conveying elements and two sets of kneading blocks, the first set of kneading blocks is a forward conveying set and is located in the middle of the elements stack. The second set of kneading blocks is about ⅔ of the way to the end and is neutral. Total L/D is 32. The first and second polyethylene components were fed to the extruder by loss in weight feeders to produce the polyethylene composition comprising 90 wt % of the first polyethylene and 10 wt % of the second polyethylene. Additionally, 1000 ppm Irganox B215 antioxidant (supplied by Ciba Specialty Chemicals Corporation, Terrytown, N.Y.) was added to the polyethylene composition during melt blending in the extruder. The production rate was about 200 lbs/hour. As used in the Example herein, the first polyethylene is ethylene-hexene copolymer having a melt index of about 2 g/10 min, a density of about 0.910 g/cc, a % HT of about 21.6% and a Mn of about 63,000 g/mol, and the second polyethylene is an ethylene-hexene copolymer having a melt index of about 16 g/10 min, a density of 0.958 g/cc, a % HT of about 89.2% and a Mn of about 29,000 g/mol. The resultant polyethylene composition has a melt index of about 2.1 g/10 min, a density of about 0.915 g/cc, a % HT of about 30.4% and a Mn of about 44,000 g/mol.

Further, in accordance with the present invention, there is provided a novel polyethylene-filler composition comprising (i) a polyethylene composition, as hereinbefore defined, having a density of from about 0.91 to about 0.93 g/cc, a melt index of from about 1 to about 5 g/10 min, a weight percent high temperature fraction (% HT) as determined by TREF of about 25 to about 50 weight %, and a number average molecular weight (Mn) of the HT fraction collected during the TREF procedure of from about 35,000 to about 52,000 g/mol with the % HT of the polyethylene composition preferably ranging from about 30 to about 45 weight %, the polyethylene composition comprising (a) a first ethylene homopolymer or ethylene interpolymer having a density of from about 0.88 to about 0.93 g/cc (grams/cubic centimeters), a melt index of from about 1 to about 5 g/10 min (grams/10 minutes), a % HT as determined by TREF of about 0 to about 50 weight %, and a Mn of the HT fraction collected during the TREF procedure of about 15,000 to about 100,000 g/mol, present in an amount of from about 1 to about 99 weight percent (%) based on the total polyethylene composition; and (b) a second ethylene homopolymer or ethylene interpolymer having a density of from about 0.93 to about 0.97 g/cc, a melt index of from about 1 to about 50 g/10 min, a % HT fraction as determined by TREF of about 25 to about 100 weight %, and a Mn of the HT fraction collected during the TREF procedure of about 15,000 to about 100,000 g/mol, present in an amount of from about 1 to about 99 weight %, based on the total weight of the polyethylene composition, the polyethylene composition preferably being present in the polyethylene-filler composition in an amount of from about 20 to about 80 weight percent (%) based on the total weight of the polyethylene-filler composition; and (ii) a filler present in an effective amount, such that a film formed from the novel polyethylene-filler composition has increased MVTR; preferably the filler is present in the polyethylene-filler composition in an amount of from about 20 to about 80 weight percent.

The first and second ethylene components of the polyethylene composition of the polyethylene-filler composition of the present invention are homopolymers of ethylene or interpolymers of ethylene and at least one or more other olefin(s). Preferably, the olefins are alpha-olefins. The olefins may contain from about 2 to about 16 carbon atoms. The interpolymers of ethylene and at least one other olefin comprise an ethylene content of at least about 50% by weight of the total monomers involved. Exemplary olefins that may be utilized herein are propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene. As described hereinabove, the first and second polyethylene components of the polyethylene composition are prepared by any techniques known in the art. The methods need not be restated here.

The fillers useful in preparing the novel polyethylene-filler compositions of this invention include any filler material that will result in a composition from which a film that is produced is characterized by having an increased MVTR. The amount of filler utilized is any amount that is effective or sufficient to provide a composition from which there can be produced films having increased MVTR. Preferably, the filler will be present in the polyethylene-filler composition in an amount of from about 20 to about 80% by weight, based on the total composition.

Exemplary fillers that are suitable for use herein are inorganic fillers such as calcium carbonate, talc, clay, kaolin, silica, diatomaceous earth, magnesium carbonate, barium carbonate, magnesium sulfate, barium sulfate, calcium sulfate, aluminum hydroxide, zinc oxide, magnesium oxide, titanium oxide, aluminum oxide, mica, glass powder, zeolite, silica clay, and the like. Preferred for use herein is a calcium carbonate, that may optionally be coated with a fatty acid. A typical calcium carbonate is that supplied by English China Clay under the registered trademark SUPERCOAT calcium carbonate, reported as being 97.6% calcium carbonate (prior to surface treatment) with a mean particle size of 1 micron (top cut of 10 microns) and surface area of 7.2 $m^2/g$ (determined by BET).

For many purposes, it may be desirable to incorporate other conventional additives with the polyethylene-filler compositions of the present invention. For example, there may be added antioxidants, heat and light stabilizers, dyes, antistatic agents, lubricants, preservatives, processing aids, slip agents, antiblocking agents, pigments, flame retardants, blowing agents, and the like. More than one additive may be used. The additive may be present in any desired amount. Accordingly, the amount of additive utilized will depend upon the particular polyethylene composition and filler used and the application or usage intended for the composition and film. Compositions containing such other additives are within the scope of this invention. It is within the skill of the ordinary artisan in possession of the present disclosure to select the appropriate additive(s) and amount thereof depending on the processing conditions and end use of the composition.

The novel polyethylene-filler compositions comprising the specified polyethylene composition and the filler can be readily prepared utilizing any conventional method, and the novel films can be formed from the resultant polyethylene compositions utilizing any means known in the art. For example, polyethylene-filler compositions can be prepared in an apparatus such as a torque rheometer, a single screw extruder or a twin screw extruder. Formation of films from the resulting compositions can be achieved by blown film technique, cast film technique, melt extrusion, as described, for example, in U.S. Pat. No. 4,880,592, or by compression molding as described, for example, in U.S. Pat. No. 4,427,614, or by any other suitable method.

In preparing the compositions of the examples herein, the polyethylene composition and the filler were compounded in a Kobelco continuous mixer model NEX-T60. The mixer was operated at 400° F., a mixing speed of 800 rpm, and a production rate of 200 lbs/hour. The polyethylene composition and the filler were fed to the mixer to produce a polyethylene filler composition containing 50 wt % filler. Additionally, 100 ppm Dynamar FX 9613 processing aid (supplied by Dyneon, Oakdale, Minn.) and 150 ppm Irganox B215 antioxidant (supplied by Ciba Specialty Chemicals Corporation, Terrytown, N.Y.) were added to the polyethylene filler composition during mixing. The polyethylene composition used herein is that described earlier having a melt index of about 2.1 g/10 min, a density of about 0.915 g/cc, a % HT of about 30.4% and a Mn of about 44,000 g/mol. The filler used in the Examples was SUPERCOAT calcium carbonate described herein.

In addition to the novel compositions, the present invention is also directed to films formed from the novel compositions that are characterized by having increased moisture vapor transmission rates.

The polyethylene-filler compositions of the present invention may be fabricated into films by any technique known in the art. For example, films may be produced by the well known cast film, blown film and extrusion coating techniques, the latter including extrusion onto a substrate. Such a substrate may also include a tie-layer. Preferred substrates include woven and nonwoven fabrics. Films produced by melt casting or blowing can be thermally bonded or sealed to a substrate using an adhesive. The ordinary artisan, in possession of the present disclosure, can prepare such films and articles containing such films without undue experimentation.

As shown hereinafter in the examples, blown film is produced from the polyethylene-filler compositions of the present invention by introducing the composition into the feed hopper of a 2.5 inch Egan extruder with a 24/1 Length/Diameter. The film was produced using a circular 6 inch Sano die having a gap of 0.088 inch (88 mils) and dual air lips. The extrusion conditions used to process the polyethylene-filler compositions were as follows:

| Barrel Temperatures | | |
|---|---|---|
| Zone 1 | ° F. | 380 |
| Zone 2 | ° F. | 450 |
| Zone 3 | ° F. | 430 |
| Zone 4 | ° F. | 420 |
| Zone 5 | ° F. | 400 |
| Die Temperatures | | |
| Zone 1 | ° F. | 425 |
| Zone 2 | ° F. | 425 |
| Zone 3 | ° F. | 425 |
| Zone 4 | ° F. | 425 |

In processing the polyethylene-filler compositions, the parameters held constant were output rate (89 lb/hr=4.7 lb/hr-in die circumference) and blow-up ratio of 2.4:1. The films were to be stretched via the interdigitation method and accordingly, were fabricated at a thickness of 1.3±0.1 mil.

Interdigitation is a stretching process that is well known in the art whereby the filled film, while under tension, is passed between intermeshing, grooved cylinders or intermeshing disks. Machine direction stretching is accomplished by passing the film through a gear-like intermeshing cylinder pair and transverse stretching is accomplished by passing the film through a disk-like roller pair. Each point of contact with the grooves or disks applies localized stress to the film. It is at these points that the film stretches. The resulting stretched film consists of narrow, parallel bands where stretching has occurred separated by bands of unstretched film. The amount of stretching is governed by the amount of interengagement between the grooved cylinder pair or the intermeshing disk pair. Pores in films stretched by this process are found in the stretched bands. When films are stretched biaxially by the interdigitation process, a crosshatched pattern of stretched bands is produced. The examples shown here of films stretched biaxially at room temperature by the interdigitation method were prepared at Biax FiberFilm Corporation, Greenville, Wis. Further information on the interdigitation method may be found in U.S. Pat. No. 4,116,892 and PCT WO 00/23255. The stretch ratio was held constant at a 1.1× machine direction stretch followed by a 1.125× transverse direction stretch. The stretch ratio is determined by drawing a 1 inch diameter circle on the film and then passing this film through the intermeshing grooved cylinder pair or intermeshing disk pair. The circle diameter is then again measured, in the direction of stretching, yielding the stretch ratio.

Additionally, the present invention is directed to articles of manufacture incorporating the novel compositions and novel films, of the present invention. Such articles include, but are not limited to, garments, diapers, sanitary napkins, medical protective garments, surgical incise drapes, transdermal patches, wound care bandages and dressings, intravenous site dressings, and ostomy site dressings, and others. The articles can be produced utilizing any suitable technique.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLES

In the following examples the test procedures listed below were used in evaluating the analytical properties of the polyethylene components and the polyethylene composition, and the physical properties of the films produced from the polyethylene-filled compositions.

(a) Density—ASTM D4883; units are g/cc (grams/cubic centimeter); plaques were produced in accordance with ASTM D1928, Procedure C;

(b) Melt Index—ASTM D1238 (Condition 190/2.6); units are g/10 min (grams/10 minutes);

(c) Dart Impact—ASTM D1709A; units are g (grams);

(d) Tensile—ASTM D882; units are g (grams);

(e) Moisture Vapor Transmission Rate (MVTR) is measured according to ASTM Test Method E96. The apparatus for this experiment consists of a test dish, environmental Thermotron test chamber, and a balance. The test dish is noncorroding and is impermeable to liquid water and water vapor. The mouth area of the dish defines the test area such that the overlay material is masked to eliminate this potential source of error. The water level is filled to ¾ inch below the mouth to avoid contact of water with the specimen and covers the dish bottom throughout the entire experiment. The Thermotron test chamber Model SM5.5S controls the temperature and relative humidity. The temperature for this work was selected at 90° F. (32° C.) which is the standard test condition designated as ASTM E-96D. The relative humidity is maintained at 50±2%. Air is continuously circulated over the face of the film at a rate of 200 m/s (meters per second). The Mettler P1200 balance detects changes in weight smaller than 1% (0.01 grams) of the weight change during the steady state period. Samples are secured on the test dish and weighed. The samples are then placed into the test chamber for two hours and then weighed again. The samples are put back into the oven for a total of 24 hours and the weights are measured twice more over the 24 hour period. The MVTR of each sample is calculated by the following equation:

$$MVTR=(g)/(A)(T)$$

Where g=weight change during test (grams)

A=test area ($m^2$)

T=time=1 day

The weight loss data is plotted and the slope of the straight line is the rate of the water vapor transmission through the film. The slope of the line is then divided by the area of the sample tested to obtain a normalized MVTR.

(f) Temperature Rising Elution Fractionation (TREF) experiments were performed with a Polymics CAP-TREF system (Polymics, State College, Pa.). Two TREF experiments were required to complete the analyses. The first one uses the analytical TREF profile to generate the weight percent of the high temperature (HT) fraction. The second one uses the fraction collection TREF profile for acquisition of the HT fraction.

Sample polymer solutions for TREF were prepared by dissolving the polyethylene into the solvent 1,2,4-trichlorobenzene (TCB) at a level of approximately 0.1 5 g polyethylene in 15 mL TCB in glass vials. The TCB used for the TREF and gel permeation chromatograph (GPC) contained approximately 2 g of 2,6-di-tert-butyl-4-methylphenol (BHT) per 4000 mL TCB as an antioxidant. The polyethylene was dissolved into the TCB by heating the samples for 4 hours at 160° C. in a Reacti-Therm III heating/stirring block (Pierce, Rockford, Ill.).

The crystallization support, CHROMOSORB P (Sigma, St. Louis, Mo.), is a 45–60 mesh acid washing diatomite. The CHROMOSORB P support was also heated to 160° C. and approximately 8 grams of the hot CHROMOSORB P support was added to the polymer solutions after all of the polyethylene was completely dissolved into the TCB. These 160° C. samples containing the polyethylene, TCB, and CHROMOSORB P support were then capped and the vials were then transferred to the crystallization oven (Despatch LAC, Despatch Industries, Minneapolis, Minn.) that had been pre-warmed to 150° C. The crystallization oven was then programmed to equilibrate the samples at 150° C. for 2 hours before cooling the samples at a rate of 2° C./hour to a temperature of 30° C. Chilled water was piped into a heat exchanger at a flow rate low enough to not disrupt the oven high temperature yet permit complete cooling to 30° C.

The polymer and TCB containing CHROMOSORB P support were then packed into analytical TREF cartridges and run in the Polymics CAP TREF using an analytical TREF profile. The analytical profile maintained the samples at 25° C. for 5 minutes and a flow rate of 10 ml/min before heating to 135° C. at a heating rate of 200° C./hour and a flow rate of 20 ml/min. The eluent was the TCB described above. The weight percent of the high temperature fractions (% HT) was defined as the proportion of material eluting above 90° C. as determined from the cumulative weight fraction curves of the analytical TREF experiments. The results of TREF are reported as wt % HT.

A second analytical TREF experiment was needed for the collection of the high temperature fraction of the polyethylene. The sample preparation was identical to the method described above. The fraction collection profile was similar to the analytical profile described above except that when the column temperature reaches 90° C. it is programmed to isotherm at that temperature for 10 minutes. After the 90° C. isotherm the solvent outlet line is moved to a beaker to collect the material that melts above 90° C. while the program proceeds by ramping the temperature to 135° C. at a heating rate of 200° C./hour and a flow rate of 20 ml/min.

The HT fraction was collected over the temperature range of 90 to 120° C. based on the analytical TREF elution curve of National Institute of Standards and Technology linear polyethylene standard SRM 1475 (U.S. Department of Commerce, Gaithersburg, Md.). This amounted to roughly 180 mL of solution. An approximately equivalent volume of acetone was added to the effluent while stirring. The mixtures were then allowed to cool to room temperature and the precipitated polymer was then filtered off using a vacuum filtration system with a 0.45 $\mu$m ZEFLUOR PTFE membrane filter (Pall Gelman Sciences, Ann Arbor, Mich.). The collected polymer was washed with excess acetone and was then collected by scraping it off the filter using a razor blade.

(g) Number Average Molecular Weight (Mn)—GPC analyses to determine number average molecular weight (Mn) were performed on the isolated HT polyethylene fractions collected during the TREF analysis using a Polymer Labs GPC 210 system (Polymer Laboratories, Amherst, Mass.) using TCB as the solvent. The GPC samples were prepared by dissolving approximately 1 mg of the isolated HT polyethylene fraction into approximately 1 mL of TCB. The samples were dissolved in glass vials at 160° C. for 4 hours using the Pierce Reacti-Therm III heater/stirrer and were then filtered using glass wool stuffed pipettes in an aluminum block heated to 160° C.

The GPC columns and detectors were maintained at 160° C. The autosampler carousel hot zone was maintained at 160° C. while the warm zone was kept at 100° C. The instrument uses both a Viscotek 210R viscometer (Viscotek Corporation, Houston, Tex.) and a Polymer Labs refractive index detector (Polymer Laboratories, Amherst, Mass.). The injection loop was a 200 μL and the flow rate was 1.0 mL/min. The column set consisted of three Polymer Labs Mixed B 300×7.5 mm columns and one Polymer Labs Mixed B 50×7.5 mm column (Polymer Laboratories, Amherst, Mass.). The system was calibrated using a set of narrow molecular weight distribution polystyrenes ranging from 7.5 million to 7,000 g/mol (Polymer Laboratories, Amherst, Mass.). The GPC data collection and molecular weight calculations were performed using the TriSEC v3.0 software (Viscotek Corporation, Houston, Tex.). The molecular weight calculations were based on the Universal Calibration method as described by Benoit et al. in the Journal of Polymer Science, part B, volume 5, page 753, published in 1967. The results of GPC analysis are reported as number average molecular weight in g/mol.

EXAMPLE 1 (Control)

In accordance with the procedure described herein, a polyethylene composition comprising 50 weight % calcium carbonate was prepared. The polyethylene utilized was ethylene-hexene copolymer having a melt index of about 2 g/10 min, a density of about 0.910 g/cc, a % HT of about 21.6%, and a Mn of about 63,000 g/mol. Films were extruded from the composition as described herein. The films were stretched as described and the test data on the films are reported in Table 1.

EXAMPLE 2

In accordance with the procedure described earlier, the polyethylene composition having a melt index of about 2.1 g/10 min, a density of about 0.915 g/cc, a % HT of about 30.4%, and a Mn of about 44,000 g/mol, described therein was prepared. The first and second polyethylene interpolymers are also fully described. Also, as described earlier, the polyethylene composition was compounded with calcium carbonate to provide a composition comprising 50 weight % filler. The resulting composition was extruded as shown herein to produce a blown film that was stretched as described. The film was tested and the results are reported in Table 1.

TABLE 1

| Example No. | 1 | 2 |
|---|---|---|
| Average MVTR, $g/m^2$/day | 388 | 551 |
| Dart Impact, g | 431 | 398 |
| Tensile Load at Yield, | | |
| MD, g | 500 | 512 |
| TD, g | 401 | 491 |
| Tensile Load at Break. | | |
| MD, g | 1147 | 950 |
| TD, g | 701 | 663 |

From the above data, it is apparent that film formed from a composition comprising a polyethylene component having specified characteristics and a filler has increased MVTR, as compared to film formed from a composition having properties not within the ranges described herein.

The invention has been described above in detail with particular reference to preferred embodiments thereof, but it will be understood that variations and modifications other than as specifically described herein can be effected within the spirit and scope of the invention. Moreover, all patents, patent applications, provisional patent applications, and literature references cited above are incorporated herein by reference for any disclosure pertinent to the practice of this invention.

We claim:

1. A composition comprising:

(a) a polyethylene composition having a density of from about 0.91 to about 0.93 g/cc, a melt index of from about 1 to about 5 g/10 min, a weight percent high temperature fraction TREF procedure of from about 15,000 to about 100,000 g/mol, said second polyethylene present in an amount of from about 1 to about 99 weight %, based on the total weight of the polyethylene composition, and (b) a filler, present in an effective amount, such that a film formed from said composition has improved moisture vapor transmission rate.

2. The composition according to claim 1 wherein the polyethylene composition has a density of about 0.915 g/cc, a melt index of about 2.1 g/10 min, a % HT of about 30.4%, and a Mn of about 44,000 g/mol, the first polyethylene is an ethylene hexene copolymer having a density of about 0.910 g/cc, a melt index of about 2 g/10 min, a % HT of about 21.6%, and a Mn of about 63,000 g/mol, and the second polyethylene is an ethylene-hexene copolymer having a density of about 0.958 g/cc, a melt index of about 16 g/10 min, a % HT of about 89.2% and a Mn of about 29,000 g/mol.

3. The composition according to claim 1 wherein the first polyethylene is an interpolymer of ethylene and hexene.

4. The composition according to claim 1 wherein the second polyethylene is an interpolymer of ethylene and hexene.

5. The composition according to claim 1 wherein the filler is present in an amount of from about 20 to about 80 weight percent, based on the weight of the total composition.

6. The composition according to claim 1 wherein the filler is a calcium carbonate.

7. A film formed from the composition according to claim 1.

8. An article of manufacture comprising the composition according to claim 1.

9. A polyethylene composition having a density of from about 0.91 to about 0.93 g/cc, a melt index of from about 1 to about 5 g/10 min, a weight percent high temperature fraction (% HT) as determined by TREF of about 25 to about 50 weight %, and a number average molecular weight (Mn) of the HT fraction collected during the TREF procedure of from about 35,000 to about 52,000 g/mol, said polyethylene composition comprising (i) a first polyethylene selected from the group consisting of a homopolymer of ethylene and an interpolymer of ethylene and at least one or more other olefin(s) having at least about 50% by weight of ethylene based upon the total monomers in the interpolymer, said first polyethylene having a density of from about 0.88 to about 0.93 g/cc, a melt index of from about 1 to about 5 g/10 min, a weight percent high temperature fraction (% HT) as determined by TREF of about 0 to about 50 weight %, and a number average molecular weight (Mn) of the HT fraction collected during the TREF procedure of from about 15,000 to about 100,000 g/mol, said first polyethylene present in an amount of from about 1 to about 99 weight %, based on the total weight of the polyethylene composition, and (ii) a second polyethylene selected from the group consisting of a homopolymer of ethylene and an interpolymer of ethylene and at least one or more other olefin(s) having at least about 50% by weight of ethylene based upon the total monomers in the interpolymer, said second polyethylene having a density of from about 0.958 to about 0.97 g/cc, a melt index of from about 1 to about 50 g/10 min, a weight percent high temperature fraction (% HT) as determined by TREF of about 25 to about 100 weight %, and a number average molecular weight (Mn) of the HT fraction collected during the TREF procedure of from about 15,000 to about 100,000 g/mol, said second polyethylene present in an amount of from about 1 to about 99 weight %, based on the total weight of the polyethylene composition.

10. The composition according to claim 9 wherein the polyethylene composition has a density of about 0.915 g/cc, a melt index of about 2.1 g/10 min, a % HT of about 30.4%, and a Mn of about 44,000 g/mol, the first polyethylene is an ethylene hexene copolymer having a density of about 0.910 g/cc, a melt index of about 2 g/10 min, a % HT of about 21.6%, and a Mn of about 63,000 g/mol, and the second polyethylene is an ethylene-hexene copolymer having a density of about 0.958 g/cc, a melt index of about 16 g/10 min, a % HT of about 89.2% and a Mn of about 29,000 g/mol.

11. The composition according to claim 9 wherein the first polyethylene is an interpolymer of ethylene and hexene.

12. The composition according to claim 9 wherein the second polyethylene is an interpolymer of ethylene and hexene.

13. The composition according to claim 1 wherein the second polyethylene has a melt index of from about 16 to about 50 g/10 min.

14. The composition according to claim 1 wherein the second polyethylene has a density of about 0.958 g/cc, and a melt index of about 16 g/10 min.

* * * * *

UNITED STATES PATENT AND TRADEMARK OFFICE

CERTIFICATE OF CORRECTION

PATENT NO. : 6,765,048 B2
DATED : July 20, 2004
INVENTOR(S) : Dohrer et al.

It is certified that error appears in the above-identified patent and that said Letters Patent is hereby corrected as shown below:

Column 12,
Lines 10-14, "temperature fraction TREF procedure of from about 15,000 to about 100,000 g/mol, said second polyethylene present in an amount of from about 1 to about 99 weight %, based on the total weight of the polyethylene composition, and" should be deleted and the following should be inserted, therefore:

-- temperature fraction (% HT) as determined by TREF of about 25 to about 50 weight %, and a number average molecular weight (mn) of the HT fraction collected during the TREF procedure of from about 35,000 to about 52,000 g/mol, said polyethylene composition comprising.

(i) a first polyethylene selected from the group consisting of a homopolymer of ethylene and an interpolymer of ethylene and at least one or more other olefin(s) having at least about 50% by weight of ethylene based upon the total monomers in the interpolymer, said first polyethylene having a density of from about 0.88 to about 0.93 g/cc, a melt index of from about 1 to about 5 g/10 min, a weight percent high temperature fraction (% HT) as determined by TREF of about 0 to about 50 weight %, and a number average molecular weight (Mn) of the HT fraction collected during the TREF procedure of from about 15,000 to about 100,000 g/mol, said first polyethylene present in an amount of from about 1 to about 99 weight %, based on the total weight of the polyethylene composition, and (ii) a second polyethylene selected from the group consisting of a homopolymer of ethylene and an interpolymer of ethylene and at least one or more other olefin(s) having at least about 50% by weight of ethylene based upon the total monomers in the interpolymer, said second polyethylene having a density of from about 0.958 to about 0.97 g/cc, a melt index of from about 1 to about 50 g/10 min, a weight percent high temperature fraction (%HT) as determined by TREF of about 25 to about 100 weight %, and a number average molecular weight (Mn) of the HT fraction collected during the TREF procedure of from about 15,000 to about 100,000 g/mol, said second polyethylene present in an amount of from about 1 to about 99 weight %, based on the total weight of the polyethylene composition, and --

Signed and Sealed this

Eleventh Day of January, 2005

JON W. DUDAS
*Director of the United States Patent and Trademark Office*